United States Patent
Moussa et al.

(10) Patent No.: US 10,280,332 B2
(45) Date of Patent: May 7, 2019

(54) PHOSPHATIZED POLYESTERS AND COATING COMPOSITIONS CONTAINING THE SAME

(71) Applicant: PPG Industries Ohio, Inc., Cleveland, OH (US)

(72) Inventors: Youssef Moussa, Loveland, OH (US); Claudia Knotts, Cranberry Townshihp, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/372,557

(22) Filed: Dec. 8, 2016

(65) Prior Publication Data

US 2017/0081549 A1 Mar. 23, 2017

Related U.S. Application Data

(63) Continuation of application No. 13/113,130, filed on May 23, 2011.

(51) Int. Cl.
| | |
|---|---|
| *B05D 1/02* | (2006.01) |
| *C09D 167/02* | (2006.01) |
| *C09D 167/00* | (2006.01) |
| *C08G 63/692* | (2006.01) |
| *B05D 3/02* | (2006.01) |
| *B05D 7/22* | (2006.01) |

(52) U.S. Cl.
CPC .............. *C09D 167/02* (2013.01); *B05D 1/02* (2013.01); *B05D 3/0236* (2013.01); *B05D 7/227* (2013.01); *C08G 63/6926* (2013.01); *C09D 167/00* (2013.01); *Y10T 428/1352* (2015.01)

(58) Field of Classification Search
CPC ..... C09D 167/00; C09D 167/02; C08L 67/02; B05D 1/02; B05D 3/0236; B05D 7/227; C08G 63/6926
See application file for complete search history.

(56) References Cited

U.S. PATENT DOCUMENTS 6,413,648 B1 * 7/2002 Heyenk ................ C09D 167/00
428/482
2007/0260003 A1 * 11/2007 Cinoman ................ C09D 5/03
524/439

* cited by examiner

*Primary Examiner* — Alexander M Weddle
(74) *Attorney, Agent, or Firm* — Lisa E. Geary

(57) ABSTRACT

A coating composition comprising a resinous binder and up to 10 percent by weight of a phosphatized polyester. The compositions are useful for coating containers of all sorts such as food and beverage containers, and the phosphatized polyester provides enhanced adhesion of the coating to the container substrate. The compositions can be formulated to be substantially free of bisphenol A (BPA) and bisphenol A diglycidyl ether (BADGE).

20 Claims, No Drawings

PHOSPHATIZED POLYESTERS AND COATING COMPOSITIONS CONTAINING THE SAME

CROSS-REFERENCE

This application is a continuation of U.S. patent application Ser. No. 13/113,130 filed May 23, 2011, and entitled: "PHOSPHATIZED POLYESTERS AND COATING COMPOSITIONS CONTAINING THE SAME".

FIELD OF THE INVENTION

The present invention relates to phosphatized polyesters and to coating compositions containing such polyesters. The compositions are useful for coating containers of various sorts such as food and beverage containers.

BACKGROUND OF THE INVENTION

A wide variety of coatings have been used to coat the surfaces of food and beverage containers. For example, metal cans are sometimes coated using coil coating or sheet coating operations, that is, a plane or coil or sheet of a suitable substrate, for example, steel or aluminum, is coated with a suitable composition and cured. The coated substrate is then formed into the canned body or canned end. Alternatively, the coating composition may be applied, for example, by spraying and dipping, to the formed can and then cured. Coatings for food and beverage containers should preferably be capable of high speed application to the substrate and provide the necessary properties when cured to perform in a demanding end use. For example, the coating should be safe for food contact and have excellent adhesion to the substrate.

Many of the coating compositions for food and beverage containers are based on epoxy resins that are the polyglycidyl ethers of bisphenol A. Bisphenol A in packaging coatings either as bisphenol A itself (BPA) or derivatives thereof, such as diglycidyl ethers of bisphenol A (BADGE), epoxy novolak resins and polyols prepared with bisphenol A and bisphenol F are problematic. Although the balance of scientific evidence available to date indicates that small trace amounts of BPA or BADGE that might be released from existing coatings does not pose health risks to humans. These compounds are nevertheless perceived by some as being harmful to human health. Consequently, there is a strong desire to eliminate these compounds from coatings for food and beverage containers. Accordingly, what is desired is a packaging coating composition for food or beverage containers that does not contain extractable quantities of BPA, BADGE or other derivatives of BPA and yet has excellent properties such as excellent adhesion to the substrate.

SUMMARY OF THE INVENTION

The present invention provides a coating composition comprising a resinous binder and up to 10 percent by weight of a phosphatized polyester and to articles coated with the coating composition.

The phosphatized polyester comprises the reaction product of:
(a) a polyester having an Mn of 2000 to 10,000, a hydroxyl number of 20 to 75, and an acid value of 15 to 25; the polyester being a polycondensate of:
   (i) a polyol component comprising a mixture of diols and triols,
   (ii) a polyacid component comprising an alpha, beta-ethylenically unsaturated polycarboxylic acid, and
(b) a phosphorus acid.

The coated article comprises:
(a) a substrate, and
(b) a coating deposited thereon from the coating composition mentioned immediately above.

The coating composition can be formulated such that it is substantially free of bisphenol A (BPA) and derivatives thereof such as bisphenol A diglycidyl ether (BADGE).

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refers to one or more of these components.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule. The term "polycarboxylic acid" refers to the acids and functional derivatives thereof, including anhydride derivatives where they exist, and lower alkyl esters having 1-4 carbon atoms.

As used herein, the term "polymer" refers broadly to prepolymers, oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_5$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "acrylic polymer" refers to polymers prepared from one or more acrylic monomers.

As used herein, "a" and "the at least one" and "one or more" are used interchangeably. Thus, for example, a coating composition that comprises "a" polymer can be interpreted to mean the coating composition includes "one or more" polymers.

As used herein, the molecular weights are determined by gel permeation chromatography using a polystyrene standard. Unless otherwise indicated, molecular weights are on a number average basis (Mn).

The phosphatized polyester is prepared by reacting a precursor polyester resin with a phosphorus acid. The polyester resin contains both hydroxyl functionality and carboxylic acid functionality. The polyester resin typically has a hydroxyl number of 20 to 75 mg KOH per gram of polyester resin and an acid value of 15 to 20 mg KOH per gram of polyester resin; each measured on a non-volatile solids basis.

The polyester resins have number average molecular weights (Mn) of 2000 to 10,000 g/mole.

Suitable polyester resins are typically prepared by condensation (esterification) according to known processes [see, for example, Zeno Wicks, Jr., Frank N. Jones and S. Peter Pappas, *Organic Coatings: Science and Technology*, Vol. 1, pp. 122-132 (John Wiley & Sons: New York, 1992)]. The polyester resin is usually derived from a mixture of at least one polyfunctional alcohol (polyol), generally a mixture of diols and triols esterified with a polyacid or anhydride. The polyacid component comprises an alpha, beta-ethylenically unsaturated polycarboxylic acid or anhydride.

The polyester resins are typically prepared from a mixture of the alpha, beta-ethylenically unsaturated polycarboxylic acid, usually with an aromatic and/or aliphatic polycarboxylic acid, and a polyol component, typically a mixture of a diol and triol. The polyol and polycarboxylic acid are combined in desired proportions and chemically reacted using standard esterification (condensation) procedures to provide a polyester having both hydroxyl and carboxylic acid groups in the polyester resin. A triol is typically used to provide a branched, as opposed to linear, polyester.

Examples of suitable polycarboxylic acids or anhydrides include, but are not limited to, maleic anhydride, maleic acid, fumaric acid, itaconic acid, phthalic acid, phthalic anhydride, isophthalic acid, trimellitic anhydride, terephthalic acid, naphthalene dicarboxylic acid, adipic acid, azelaic acid, succinic acid, sebacic acid and various mixtures thereof.

When used, the aromatic and/or aliphatic polycarboxylic acid is used in amounts up to 70 percent by weight, typically 50 to 65 percent by weight based on total weight of the polycarboxylic acid or anhydride.

Examples of suitable diols, triols and polyols include, but are not limited to, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexane dimethanol, and polyethylene or polypropylene glycol.

As mentioned above, the polyol component is a mixture of a diol and a triol. The weight ratio of diol to triol typically ranges from 0.5 to 10 to 1.

The equivalent ratio of polyol component to polycarboxylic acid is from 0.9 to 1.1 to 1.0.

The phosphorus acid which is reacted with the polyester resin can be a phosphinic acid, a phosphonic acid or is preferably phosphoric acid. The phosphoric acid can be in the form of an aqueous solution, for example, an 85 percent by weight aqueous solution, or can be 100 percent phosphoric acid or super phosphoric acid. The acid is provided in amounts of about 0.2-0.5 equivalents of phosphoric acid per hydroxyl equivalent of the polyester resin, i.e., 0.2-0.45 P—OH groups per hydroxyl group.

The reaction of the phosphorus acid with the polyester resin is typically conducted in organic solvent. The organic solvent is typically an aromatic solvent, a ketone or an ester having a boiling point of about 65 to 250° C. Examples of suitable solvents include methyl ethyl ketone, methyl isobutyl ketone, butyl glycol acetate and methoxypropyl acetate. The organic solvent for the reaction is typically present in amounts of about 20 to 50 percent by weight based on total weight of phosphorus acid, polyester resin and organic solvent.

The reactants and the organic solvent are typically mixed at a temperature between 50° C. to 95° C. and once the reactants are contacted, the reaction mixture is maintained at a temperature preferably between 90° C. to 200° C. The reaction typically is allowed to proceed for a period of about 45 minutes to 6 hours.

The phosphatized polyester is used, typically in minor amounts, in a coating composition where it provides for improved adhesion of the resultant coating to the substrate. The phosphatized polyester is typically present in the coating composition in amounts up to 10 percent by weight, preferably 0.1 to 5 percent by weight based on weight of resin solids in the coating composition. Amounts less than 0.1 percent by weight result in inferior adhesion of the coating composition to the substrate where amounts greater than 10 percent by weight provide no additional advantage.

Besides the phosphatized polyester, the coating composition comprises a resinous vehicle, organic solvent and further optional ingredients.

The resinous vehicle is preferably an acrylic polymer and/or a polyester polymer. The acrylic polymer is preferably a polymer derived from one or more acrylic monomers. Furthermore, blends of acrylic polymers can be used. Preferred monomers are acrylic acid, methyl acrylate, ethyl acrylate, propyl acrylate, butyl acrylate, penta acrylate, hexyl acrylate, methacrylic acid, methyl methacrylate, ethyl methacrylate, propyl methacrylate, butyl methacrylate, penta methacrylate and hexyl methacrylate. The acrylic polymer may also contain hydroxyl groups which typically are derived from hydroxy-substituted acrylic or methacrylic acid esters. Examples include hydroxyethyl acrylate and hydroxypropyl methacrylate. The weight average molecular weight (Mw) of the acrylic polymer component is preferably at least 5,000 g/mole, more preferably from 15,000 to 100,000 g/mole.

The acrylic polymer typically has an acid value of 30 to 70, such as 40 to 60 mg KOH/g; a hydroxyl value of 0 to 100, such as 0 to 70 mg of KOH/g and a glass transition temperature (Tg) of −20 to +100° C., such as +20 to +70° C.

The polyester polymers are prepared by processes well known in the art as mentioned above comprising the condensation polymerization reaction of one or more polycarboxylic acids with one or more polyols. Examples of suitable polycarboxylic acids are phthalic acid, isophthalic acid, terephthalic acid, 1,4-cyclohexane dicarboxylic acid, succinic acid, sebacic acid, methyltetrahydrophthalic acid, methylhexahydrophthalic acid, tetrahydrophthalic acid, dodecane dioic acid, adipic acid, azelaic acid, naphthylene dicarboxylic acid, pyromellitic acid, dimer fatty acids and/or trimellitic acid.

The polyol component is, for example, selected from diols or triols. Examples of suitable polyols include ethylene glycol, 1,3-propanediol, diethylene glycol, dipropylene glycol, triethylene glycol, 1,4-butanediol, 2-methyl-1,3-propanediol, 1,4-cyclohexane dimethanol, 1,6-hexanediol, neopentyl glycol, trimethylolpropane and glycerol. The polyester polymer preferably has a number average molecular weight between 1000 and 20,000 g/mole.

The polyester polymers typically have an acid value between 0 to 20, such as 0 to 5 mg of KOH/g, a hydroxyl number between 50 to 200, such as 70 to 150 mg of KOH/g, a glass transition temperature (Tg) between −20° C. and +50° C., such as −10° C. and +40° C.

Typically curing agents are present in the resinous vehicle, which are reactive with the acrylic and polyester polymers. Suitable curing agents are phenolplasts or phenol-formaldehyde resins and aminoplast or triazine-formaldehyde resins. The phenol-formaldehyde resins are preferably of the resol type. Examples of suitable phenols are phenol itself, butyl phenol, xylenol and cresol. Cresol-formaldehyde resins, the types typically etherified with butanol, are often used. For the chemistry in preparation of phenolic resins, reference is made to "The Chemistry and Application of Phenolic Resins or Phenolplasts", Vol. V, Part I, edited by Dr. Oldring; John Wiley & Sons/Cita Technology Limited, London, 1997. Examples of commercially available phenolic resins are PHENODUR® PR285 and BR612 and those resins sold under the trademark BAKELITE®, typically BAKELITE 6581 LB.

Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Typically, the acrylic polymer and/or the polyester polymer is used in amounts of 40 to 90, preferably 30 to 70 percent by weight, and the crosslinking agent is present in amounts of 5 to 50, preferably 20 to 40 percent by weight, the percentages by weight being based on the weight of total resin solids in the coating composition.

Optional ingredients can be included in the coating composition. Typically, the coating composition will contain a diluent, such as water, or an organic solvent or a mixture of water and organic solvent to dissolve or disperse the resinous binder and the phosphated polyester. The organic solvent is selected to have sufficient volatility to evaporate essentially entirely from the coating composition during the curing process such as during heating from 175-205° C. for about 5 to 15 minutes. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. For aqueous compositions, the resinous vehicle typically has acid groups, such as acid functional acrylic polymers, that are at least partially neutralized with an amine to assist in the dispersion or dissolution in the aqueous medium. When present, the diluents are used in the coating compositions in amounts of about 20 to 83, preferably 30 to 70 percent by weight based on total weight of the coating composition.

Adjuvant resins such as polyether polyols and polyurethane polyols may be included in the coating compositions to maximize certain properties of the resultant coating. When present, the adjuvant resin is used in amounts of up to 50, typically 2-50 percent by weight based on weight of resin solids of the coating composition.

Another optional ingredient that is typically present in the coating composition is a catalyst to increase the rate of cure or crosslinking of the coating compositions. Generally acid catalyst may be used and is typically present in amounts of about 0.05 to 5 percent by weight. Examples of suitable catalyst are dodecyl benzene sulfonic acid, methane sulfonic acid, paratoluene sulfonic acid, dinonyl naphthalene disulfonic acid and phenyl phosphonic acid. It has been found that the amount of acid catalyst in the coating compositions of the invention is not as great as would normally be expected due to the presence of the phosphated polyester. This reaction product is acidic and has been found to contribute to the cure of the coating composition.

Another useful optional ingredient is a lubricant, for example, a wax which facilitates manufacture of metal closures by imparting lubricity to the sheets of the coated metal substrate. Preferred lubricants include, for example, carnauba wax and polyethylene-type lubricants. If used, the lubricant is preferably present in the coating compositions of at least 0.1 percent by weight based on weight of resin solids in the coating composition.

Another useful optional ingredient is a pigment such as titanium dioxide. If used, the pigment is present in the coating compositions in amounts no greater than 70 percent by weight, preferably no greater than 40 percent by weight based on total weight of solids in the coating composition.

Surfactants can optionally be added to the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

In certain embodiments, the compositions used in the practice of the invention, are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof are not intentionally added but may be present in trace amounts because of unavoidable contamination from the environment. The compositions can also be substantially free and may be essentially free and may be completely free of Bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above mentioned compounds derivatives or residues thereof.

The coating compositions of the present invention can be applied to containers of all sorts and are particularly well adapted for use on food and beverage cans (e.g., two-piece cans, three-piece cans, etc.). Besides food and beverage containers, the coating compositions can be applied to containers for aerosol applications such as deodorant and hair spray.

Two-piece cans are manufactured by joining a can body (typically a drawn metal body) with a can end (typically a drawn metal end). The coatings of the present invention are suitable for use in food or beverage contact situations and may be used on the inside or outside of such cans. They are suitable for spray applied, liquid coatings, wash coatings, sheet coatings, over varnish coatings and side seam coatings.

Spray coating includes the introduction of the coating composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove the residual solvents and harden the coating.

A coil coating is described as the coating, typically by a roll coating application, of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing preformed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife". Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets". Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff. The liquid coatings that function in this role are termed "side seam stripes". Typical side seam stripes are spray applied and cured quickly via residual heat from the welding operation in addition to a small thermal, ultraviolet, and/or electromagnetic oven.

EXAMPLES

The following examples are offered to aid in understanding of the present invention and are not to be construed as limiting the scope thereof. Unless otherwise indicated, all parts and percentages are by weight.

Example A

Phosphatized Polyester

A phosphatized polyester resin was prepared from the following mixture of ingredients:

| Ingredient | Parts by Weight |
| --- | --- |
| 2-Methyl 1,3-Propane diol | 19.90 |
| Trimethylol propane | 3.01 |
| Isophthalic acid | 14.35 |
| Dibutyl tin oxide (catalyst) | 0.06 |
| Maleic anhydride | 8.35 |
| Phthalic anhydride | 7.30 |
| Aromatic 100[1] | 7.79 |
| Phosphoric acid (85% solvents) | 1.11 |
| Water | 0.08 |
| 2-Butoxyethanol | 4.26 |
| Monobutyl ether of diethylene glycol | 33.80 |

[1]Aromatic solvent from Exxon Mobile.

The first two ingredients were charged in a reaction vessel equipped with an agitator, a nitrogen blanket and a distillation set up and heated to 50° C. Once the temperature was reached, then the next four ingredients were added to the vessel and slowly heated to distillation. The mixture was esterified under a nitrogen atmosphere over a period of about twelve (12) hours at a temperature ranging between 180° C. and 240° C.

When the acid value of the mixture dropped to about 13.00 mg of KOH/g, the mixture was cooled to about 160° C. and then the Aromatic 100 solvent (i.e., an aromatic hydrocarbon solvent blend commercially available from Exxon Mobil) was incorporated for azeotropic distillation of water evolved as a condensate by-product. Thereafter, the phosphoric acid solution and water were added and the azeotropic distillation of water was continued until the acid value of the mixture dropped to below 20 mg of KOH/g. The resulting phosphatized polyester resin was then dissolved in the 2-butoxyethanol and monobutyl ether of diethylene glycol to produce a composition which was about 50 percent by weight solids.

The number average molecular weight of the resulting phosphatized polyester was about 4500, the acid value was about 20 and the hydroxyl value was about 45.

Example B (Comparative)

Reaction Product of Phosphoric Acid and Bisphenol A Diglycidyl Ether 11.01 g of 85 percent orthophosphoric acid and 14.24 g of butanol is added to the flask. The mixture is heated to 230° F. (110° C.) under nitrogen inert blanket. When the temperature is reached, the nitrogen blanket is turned off and a premix of 45.64 g of bisphenol A diglycidyl ether (0.286 equivalents of phosphoric acid per equivalent of epoxy) and 22.53 g of butanol is fed over a period of 2 hours and 10 minutes. The batch temperature is maintained below 245° F. (118° C.) during the addition. After the completion of the feed, 2.18 g of butanol is added to the flask and temperature is reduced to 219° F. (104° C.) and held for additional 2 hours. Additional 2.76 g of butanol is added to the flask and the resulting reaction product had a resin solids content of 55.92 percent by weight.

Examples 1-3

A series of container coating compositions were prepared based on a binder comprising a polyester polyol and aminoplast and phenolplast curing agents. One composition (Example 1) contained a phosphatized polyester adhesion promoter, a second composition (Example 2) contained the bisphenol A diglycidyl ether (BADGE) adhesion promoter and the third composition (Example 3, control) contained no adhesion promoter.

The ingredients were added to a container with mild agitation to form clear varnishes. Each of the varnishes were drawn down over zinc treated aluminum panels that were baked in an electric forced draft oven to give a peak metal temperature of 450° F. (232° C.). The cured coatings were then evaluated for adhesion and blushing. The results are reported in Table I below.

TABLE I

Coating Properties

| Example No. | Coating Weight[1] | MEK Double Rubs[2] | 15 Minutes Boiling Dowfax[3] Blush[6] | 15 Minutes Boiling Dowfax[3] Adhesion[7] | 30 Minutes Boiling Acetic Acid[4] Blush | 30 Minutes Boiling Acetic Acid[4] Adhesion | 30 Minutes at 250° F. (121° C.) Retort[5]: Deionized Water Blush | 30 Minutes at 250° F. (121° C.) Retort[5]: Deionized Water Adhesion | 30 Minutes at 250° F. (121° C.) Retort: Water pH = 9 Blush | 30 Minutes at 250° F. (121° C.) Retort: Water pH = 9 Adhesion |
|---|---|---|---|---|---|---|---|---|---|---|
| 1 | 7.05 | 94 | 4 | 100% | 4 (micro-popping) | 100% | 8 | 100% | 6 | 100% |
| 2 (comparative) | 7.05 | 40 | 3 | 100% | 7 | 100% | 3 | 5% | 1 | 80% |
| 3 (control) | 7.05 | 30 | 4 | 100% | 3 | 30% | 6 | 100% | 6 | 100% |

[1] Coating Weight in milligrams per square inch.

[2] A cotton pad soaked with methyl ethyl ketone (MEK) was moved back and forth under constant pressure over the coating until the coating was severely damaged. After 100 double rubs, the test was terminated.

[3] Dowfax Detergent Test: The "Dowfax" test is designed to measure the resistance of a coating to a boiling detergent solution. The solution is prepared by mixing 5 ml of Dowfax 2A1 (product of Dow Chemical) into 3000 ml of deionized water. The coated substrates are immersed into the boiling Dowfax solution for 15 minutes. The substrates are then rinsed and cooled in deionized water, dried and then tested and rated for blush and adhesion.

[4] Three (3) percent by weight acetic acid in water.

[5] Process or Retort Resistance: This is a measure of the coating integrity of the coated substrate after exposure to heat and pressure with a liquid such as water. For the present evaluation, the coated substrates were immersed in deionized water or water at a pH of 9 and subjected to heat of 121° C. (250° F.) and pressure of 1.05 kg/cm for a period of 30 minutes. The substrates were then dried and tested for adhesion and blush.

[6] Blush Resistance: Blush Resistance measures the ability of a coating to resist attack by various solutions. Typically, blush is measured by the amount of water absorbed into a coated film. When the film absorbs water, it generally becomes cloudy or looks white. Blush is measured visually using a scale of 0-10 where a rating of "10" indicates no blush and a rating of "0" indicates complete whitening of the film.

[7] Adhesion: Adhesion testing is performed to assess whether the coating adheres to the coated substrate. The adhesion test was performed according to ASTM D3359-Test Method B, using Scotch 610 tape, available from 3M Company of Saint Paul, Minn. Adhesion is generally rated on a scale of 0-100 where a rating of "100" indicates no adhesion failure and a rating of "90" indicates 90% of the coating remains adhered.

The invention claimed is:

1. A method for applying a cured coating to a food or beverage container, the method comprising:
   (a) depositing a liquid coating composition on a substrate, wherein the coating composition comprises a resinous binder, and 0.1 to 10 percent by weight of a phosphatized polyester based on weight of resin solids in the coating composition, wherein the phosphatized polyester comprises a reaction product comprising:
   (A) a polyester having an Mn of 2,000 to 10,000, a hydroxyl number of 20 to 75, and an acid value of 15 to 25, wherein the polyester comprises a polycondensate of:
      (I) a polyol component comprising a mixture of diols and triols, and
      (II) a polyacid component comprising an alpha, beta-ethylenically unsaturated polycarboxylic acid, and
   (B) a phosphorus acid;
   wherein the coating composition is dissolved or dispersed in a diluent; and
   (b) heating the substrate with the deposited coating composition to a temperature and for a time sufficient to evaporate the diluent from the coating composition and to cure the coating composition.

2. The method of claim 1, wherein the diluent is water, organic solvent or a mixture of water and organic solvent.

3. The method of claim 1, wherein the diluent is present in an amount of 20 to 83 percent by weight based on total weight of the coating composition.

4. The method of claim 1, wherein the liquid coating composition is applied to the interior surface of a preformed food or beverage container.

5. The method of claim 4, wherein the liquid coating composition is applied to a can end.

6. The method of claim 1, wherein the liquid coating composition is deposited to a metal substrate before the substrate is formed into the food or beverage container, and the method further comprises:
   (c) forming the coated substrate into the food or beverage container.

7. The method of claim 6, wherein the metal substrate is a metal coil.

8. The method of claim 1, wherein mixture of diols and triols of the polyol component is provided as a weight ratio of 0.5:1 to 10:1 diol:triol.

9. The method of claim 1, wherein the polyol and polyacid components are provided as a weight ratio of 0.9:1 to 1.1:1 polyol:polyacid.

10. The method of claim 1, wherein the phosphorous acid is provided in amounts of 0.2 to 0.5 equivalents phosphorous acid per hydroxyl equivalent of the polyester.

11. A metal coil coated with a liquid coating composition according to the method of claim 1.

12. The metal coil of claim 11, wherein the metal coil is formed into a food or beverage container comprising the liquid coating composition on an interior surface thereof.

13. A food or beverage container coated with a liquid coating composition according to the method of claim 1.

14. The container of claim 13, wherein the substrate is a can, and the liquid coating composition is coated on an interior surface of the can.

15. A method for coating a substrate, the method comprising:
   (a) depositing a liquid coating composition on a substrate, wherein the coating composition comprises a resinous binder, and 0.1 to 10 percent by weight of a phosphatized polyester based on weight of resin solids in the coating composition, wherein the phosphatized polyester comprises a reaction product comprising:
      (A) a polyester having an Mn of 2,000 to 10,000, a hydroxyl number of 20 to 75, and an acid value of 15 to 25, wherein the polyester comprises a polycondensate of:
         (I) a polyol component comprising a mixture of diols and triols provided as a weight ratio of 0.5:1 to 10:1 diol:triol, and
         (II) a polyacid component comprising an alpha, beta-ethylenically unsaturated polycarboxylic acid, and
      (B) a phosphorus acid provided in amounts of 0.2-0.5 equivalents phosphorous acid per hydroxyl equivalent of the polyester;
      wherein the coating composition is dissolved or dispersed in a diluent; and
   (b) heating the substrate with the deposited coating composition to a temperature and for a time sufficient to evaporate the diluent from the coating composition and to cure the coating composition.

16. The method of claim 15, wherein the substrate is a metal coil, and the liquid coating composition is deposited on the substrate before the substrate is formed into a food or beverage container, and the method further comprises:
   (c) forming the substrate into the food or beverage container.

17. The method of claim 15, wherein the substrate is a food or beverage container.

18. The method of claim 17, wherein the liquid coating composition is deposited on an interior surface of the food or beverage container.

19. The method of claim 17, wherein the substrate is a can.

20. The method of claim 15, wherein the substrate is a metal substrate for use as all or a portion of a food or beverage container.

* * * * *